(12) United States Patent
Anand et al.

(10) Patent No.: US 7,958,315 B2
(45) Date of Patent: *Jun. 7, 2011

(54) PREFETCHING IN A VIRTUAL MEMORY SYSTEM BASED UPON REPEATED ACCESSES ACROSS PAGE BOUNDARIES

(75) Inventors: Vaijayanthimala K. Anand, Austin, TX (US); Sandra K. Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 526 days.

This patent is subject to a terminal disclaimer.

(21) Appl. No.: 12/015,656

(22) Filed: Jan. 17, 2008

(65) Prior Publication Data

US 2008/0133840 A1 Jun. 5, 2008

Related U.S. Application Data

(63) Continuation of application No. 11/127,922, filed on May 12, 2005, now Pat. No. 7,395,406.

(51) Int. Cl.
*G06F 12/08* (2006.01)
(52) U.S. Cl. ........ 711/137; 711/204; 711/205; 711/206; 711/207; 711/E21.004
(58) Field of Classification Search .................. 711/204, 711/205
See application file for complete search history.

(56) References Cited

U.S. PATENT DOCUMENTS

| 4,638,426 | A |  | 1/1987 | Chang et al. |
| 4,876,646 | A | * | 10/1989 | Gotou et al. ................. 711/206 |
| 5,751,990 | A |  | 5/1998 | Krolak et al. |
| 5,918,245 | A |  | 6/1999 | Yung |
| RE37,305 | E |  | 7/2001 | Chang et al. |
| 6,304,962 | B1 | * | 10/2001 | Nair ............................... 712/240 |
| 6,418,522 | B1 |  | 7/2002 | Gaertner et al. |
| 6,678,795 | B1 | * | 1/2004 | Moreno et al. ................ 711/137 |
| 6,789,171 | B2 |  | 9/2004 | Desai et al. |
| 6,886,085 | B1 | * | 4/2005 | Shuf et al. ..................... 711/159 |
| 6,961,837 | B2 | * | 11/2005 | Haren et al. ................... 711/202 |
| 2004/0123044 | A1 | * | 6/2004 | Franaszek ..................... 711/137 |
| 2004/0205299 | A1 | * | 10/2004 | Bearden ........................ 711/137 |
| 2006/0026365 | A1 | * | 2/2006 | Yamazaki ...................... 711/137 |
| 2006/0206686 | A1 | * | 9/2006 | Banerjee et al. .............. 711/205 |
| 2008/0133873 | A1 | * | 6/2008 | Anand et al. .................. 711/205 |

OTHER PUBLICATIONS

Madhusudhan Talluri and Mark D. Hill. "Surpassing the TLB Performance of Superpages with Less Operating System Support." 1994. ACM. ASPLOS 1994.*

Gokul B. Kandiraju. "Towards Self-Optimizing Memory Management." May 2004. Pennsylvania State University, Department of Computer Science and Engineering. Ch. 2.*

(Continued)

*Primary Examiner* — Reginald G Bragdon
*Assistant Examiner* — Nathan Sadler
(74) *Attorney, Agent, or Firm* — Dillon & Yudell LLP (57) ABSTRACT

A system and method of improved handling of large pages in a virtual memory system. A data memory management unit (DMMU) detects sequential access of a first sub-page and a second sub-page out of a set of sub-pages that comprise a same large page. Then, the DMMU receives a request for the first sub-page and in response to such a request, the DMMU instructs a pre-fetch engine to pre-fetch at least the second sub-page if the number of detected sequential accesses equals or exceeds a predetermined value.

4 Claims, 5 Drawing Sheets

OTHER PUBLICATIONS

Doug Joseph and Dirk Grunwald. "Prefetching using Markov Predictors." 1997. ACM. ISCA 1997.*

Gokul B. Kandiraju and Anand Sivasubramaniam. "Going the Distance for TLB Prefetching: An Application-driven Study." 2002. ACM. ISCA 2002.*

Inshik Song and Yookun Cho. "Page Prefetching Based on Fault History." 1993. USENIX. USENIX MACH III Symposium. pp. 203-214.*

Jung-Hoon Lee, Jang-Soo Lee, Seh-Woong Jeong, and Shin-Dug Kim. "A Banked-Promotion TLB for High Performance and Low Power." Sep. 2001. IEEE. ICCD 2001.*

Kavita Bala et al., Software Prefetching and Caching for Translation Lookaside Buffers, Proceedings of the First Symposium on Operating System Design and Implementation, Nov. 1994.

Intel Architecture Optimization Reference Manual, 1998, 1999.

Ashley Saulsbury et al., Recency-Based TLB Preloading, ACM, 2000.

Lixin Zhang et al., The Impulse Memory Controller, Sep. 24, 2001.

Notice of Allowability dated Sep. 10, 2010; U.S. Appl. No. 12/015,669.

* cited by examiner

PREFETCHING IN A VIRTUAL MEMORY SYSTEM BASED UPON REPEATED ACCESSES ACROSS PAGE BOUNDARIES

PRIORITY CLAIM

The present application is a continuation of U.S. patent application Ser. No. 11/127,922, now U.S. Pat. No. 7,395,406, which was filed on May 12, 2005, entitled, "System and Method of Improved Large Page Handling in a Virtual Memory System," and is incorporated herein by reference.

BACKGROUND OF THE INVENTION

1. Technical Field

The present invention relates in general to the field of data processing systems, particularly, memory within data processing systems. Still more particularly, the present invention relates to virtual memory management within data processing systems.

2. Description of the Related Art

Modern data processing systems typically utilize a virtual memory system to address very large amounts of memory, even though the main memory of the system encompasses a much smaller address space. Preferably, virtual memory systems include small storage capacity, rapid access memories (e.g., caches and random-access memory) and large storage capacity, slower access memories (e.g., hard disk drives). To maintain the illusion of a large, addressable memory space, recently-accessed data and instructions are stored in the small storage capacity, rapid access memories. Infrequently-accessed data and instructions are stored in large storage capacity, slower access memories and are only retrieved when requested by a data processing component, such as a processor.

To facilitate the retrieval and access of data within the virtual memory system, data and instructions are typically stored in discrete memory units. Such discrete memory units are typically referred to as "pages". Because the physical location of a particular memory page may be located in any level of the virtual memory hierarchy, most modern data processing systems transfer or "page" memory pages between various levels of the virtual memory hierarchy as needed. While the various components of the data processing system submit requests to the virtual memory system for required memory pages utilizing a virtual memory address, a page frame table (PFT) is utilized to translate the virtual memory address to an actual physical address of the requested memory page.

Due to their very large size, page frame tables are typically stored in system memory and are often also paged. Those with skill in this art will appreciate that a method of minimizing the cost of main memory access time is to cache recently-accessed page table entries so the page table entry retrieval process is skipped if the current memory page request references the same page as a recently accessed page. Typically, the recently-accessed page table entry is saved in a special translation cache, known to those skilled in this art as a translation lookaside buffer (TLB).

Some modern data processing systems also support large pages to potentially increase memory coverage within the system memory. Such large pages require less memory to store metadata (e.g., page table entries within a page table) for a given memory range. They also require less overhead and can potentially improve performance for applications that have high memory demands. However, large pages may suffer from internal fragmentation, where a large amount of memory within a page is wasted or underutilized. Therefore, there is a need for a system and method for providing for more efficient processing of large memory pages in a data processing system.

SUMMARY OF THE INVENTION

As disclosed, the present invention is a system and method of improved handling of large pages in a virtual memory system. A data memory management unit (DMMU) detects a virtual sequential access of a first sub-page and a second sub-page out of a set of sub-pages that comprise a single large page. Thereafter, the DMMU receives a request for the first sub-page and in response to such a request, the DMMU instructs a pre-fetch engine to pre-fetch at least the second sub-page, if the number of detected sequential accesses exceeds a predetermined value. Those with skill in this art will appreciate that the present invention may also apply to instruction requests controlled by an instruction memory management unit (IMMU).

These and other features and advantages of the present invention will be described in, or will become apparent to those of ordinary skill in the art in view of the following detailed description of the preferred embodiments.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
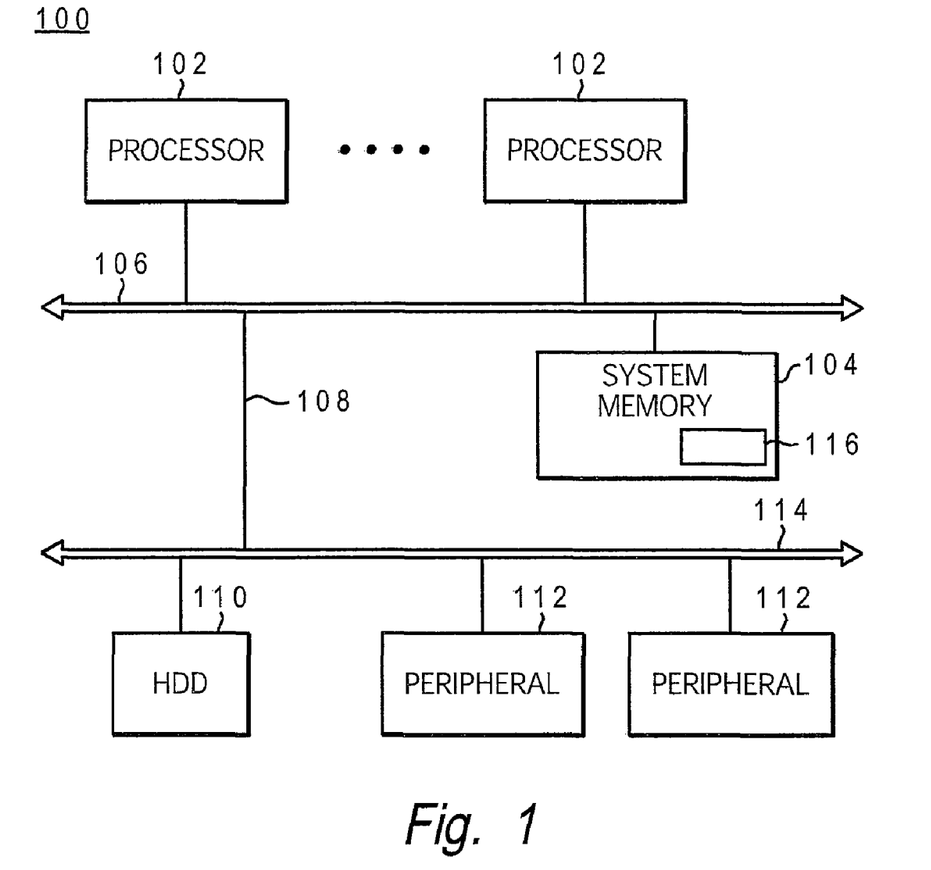
FIG. 1 is a block diagram depicting an exemplary data processing system in which a preferred embodiment of the present invention may be implemented.

With reference now to the figures and in particular, with reference to FIG. 1, there is depicted a block diagram illustrating an exemplary data processing system 100 in which a preferred embodiment of the present invention may be implemented. Exemplary data processing system 100 may be implemented on a general purpose computer, such as one of the members of the IBM-compatible family of computers, or one of several workstation or graphics computer devices which are presently commercially available.

As depicted, exemplary data processing system 100 includes processor(s) 102, which are coupled to system memory 104 via system bus 106. Preferably, system memory 104 may be implemented as a collection of dynamic random access memory (DRAM) modules. Typically, system memory 104 includes data, instructions, and a page frame table (PFT) 116. Mezzanine bus 108 acts as an intermediary between system bus 106 and peripheral bus 114. Those with skill in this art will appreciate that peripheral bus 114 may be implemented as a peripheral component interconnect (PCI), accelerated graphics port (AGP), or any other peripheral bus. Coupled to peripheral bus 114 is hard disk drive 110, which is utilized by data processing system 100 as a mass storage device. Also coupled to peripheral bus 114 are a collection of peripherals 112.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 to improve handling of large memory pages provided by the present invention are applicable to data processing systems of any system architecture and are in no way limited to the generalized multi-processor architecture or symmetric multi-processing (SMP) architecture illustrated in FIG. 1.

Figure 2:
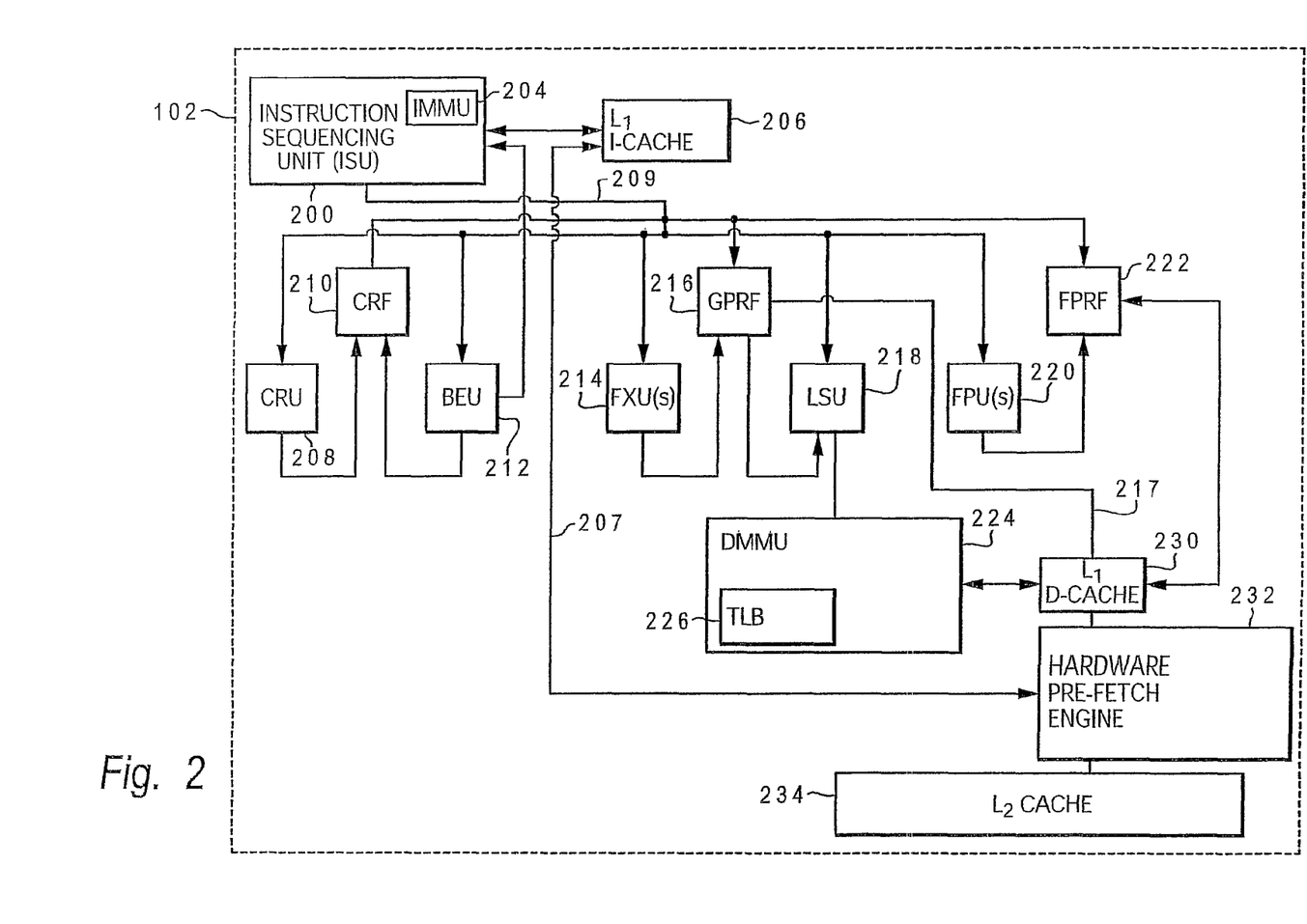
FIG. 2 is a block diagram illustrating a processor of FIG. 1 in which a preferred embodiment of the present invention may be implemented.

Referring now to FIG. 2, there is a detailed block diagram illustrating an exemplary processor in which a preferred embodiment of the present invention may be implemented. As shown, processor 102 contains an instruction pipeline including an instruction sequencing unit (ISU) 200 and a number of execution units 208, 212, 214, 218, and 220. ISU 200 fetches instructions for processing from an L1 I-cache 206 utilizing real addresses obtained by the effective-to-real address translation (ERAT) performed by instruction memory management unit (IMMU) 204. Of course, if the requested cache line of instructions does not reside in L1 I-cache 206, then ISU 200 requests the relevant cache line of instructions from L2 cache 234 via I-cache reload bus 207, which is also coupled to a pre-fetch engine 232.

After instructions are fetched and pre-processing, if any, is performed, ISU 200 dispatches instructions, possibly out-of-order, to execution units 208, 212, 214, 218, and 220 via instruction bus 209 based upon instruction type. That is, condition-register-modifying instructions and branch instructions are dispatched to condition register unit (CRU) 208 and branch execution unit (BEU) 212, respectively, fixed-point and load/store instructions are dispatched to fixed-point unit(s) (FXUs) 214 and load-store unit(s) (LSUs) 218, respectively, and floating-point instructions are dispatched to floating-point unit(s) (FPUs) 220.

After possible queuing and buffering, the instructions dispatched by ISU 200 are executed opportunistically by execution units 208, 212, 214, 218, and 220. Instruction "execution" is defined herein as the process by which logic circuits of a processor examine an instruction operation code (opcode) and associated operands, if any and in response, move data or instructions in the data processing system (e.g., between system memory locations, between registers or buffers and memory, etc.) or perform logical or mathematical operations on the data. For memory access (i.e., load-type or store-type) instructions, execution typically includes calculation of a target effective address (EA) from instruction operands.

During execution within one of execution units 208, 212, 214, 218, and 220, an instruction may receive input operands, if any, from one or more architected and/or rename registers within a register file coupled to the execution unit. Data results of instruction execution (i.e., destination operands), if any, are similarly written to instruction-specified locations within the register files by execution units 208, 212, 214, 218, and 220. For example, FXU 214 receives input operands from and stores destination operands to a floating-point register file (FPRF) 222, and LSU 218 receives input operands from GPRF 216 and causes data to be transferred between L1 D-cache 230 (via interconnect 217) and both GPRF 216 and FPRF 222. Similarly, when executing condition-register-modifying or condition-register-dependent instructions, CRU 208 and BEU 212 access control register file (CRF) 210, which in a preferred embodiment includes a condition register, link, register, count register, and rename registers of each. BEU 212 accesses the values of the condition, link, and count registers to resolve conditional branches to obtain a path address, which BEU 212 supplies to instruction sequencing unit 200 to initiate instruction fetching along the indicated path. After an execution unit finishes execution of an instruction, the execution unit notifies instruction sequencing unit 200, which schedules completion of instructions in program order and the commitment of data results, if any, the architected state of processing unit 102.

Still referring to FIG. 2, a preferred embodiment of the present invention preferably includes a data memory management unit (DMMU) 224. DMMU 224 translates effective addresses (EA) in program-initiated load and store operations received from LSU 218 into physical address (PA) utilized the volatile memory hierarchy comprising L1 D-cache 230, L2 cache 234, and system memory 104. DMMU 224 also includes a translation lookaside buffer (TLB) 226.

Figure 3:
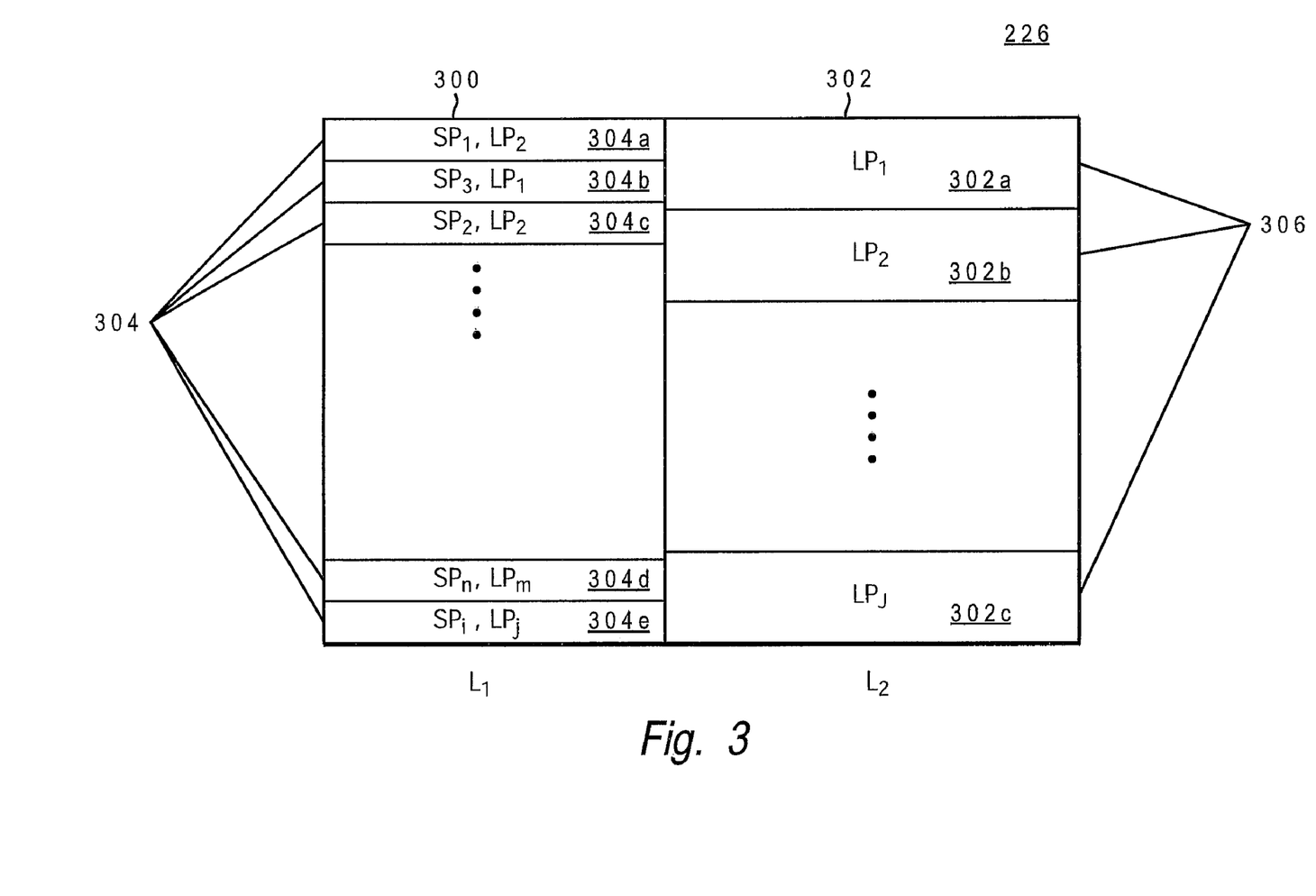
FIG. 3 is a block diagram depicting a multi-tiered translation lookaside buffer (TLB) of FIG. 2 in which a preferred embodiment of the present invention may be implemented.

TLB 226, referenced herein in more detail in conjunction with FIG. 3, buffers copies of a subset of page table entries (PTEs), which are utilized to translate effective addresses (EAs) employed by software executing within processor 102 into physical addresses (PAs). As utilized herein, an effective address (EA) is defined as an address that identifies a memory storage location or other resource mapped to a virtual address space. A physical address (PA), on the other hand, is defined herein as an address within a physical address space that identifies a read memory storage location or other real resource.

Referring now to FIG. 3, there is a more detailed block diagram illustrating TLB 226 of FIG. 2. As illustrated, TLB 226 includes two levels, hereinafter referenced as level-one (L1) TLB 300 and level-two (L2) TLB 302.

As previously discussed, many modern data processing systems support different memory page sizes within the virtual memory system. Larger pages offer advantages such as increased memory coverage in a single page and lower memory requirements for the storage of metadata to describe each memory page. However, memory systems often access only portions of larger pages. These portions are hereinafter referred to as "sub-pages". Therefore, according to a preferred embodiment of the present invention, DMMU 224 monitors the page reference behavior of an executing application and instructs hardware pre-fetch engine 232 to pre-fetch sub-pages into L1 TLB 300 when another sub-page, contained within the same large page is fetched into L1 TLB 300 on demand, if a number of sequential accesses between the first sub-page and the pre-fetched sub-pages equals or exceeds a pre-determined value. As illustrated in FIG. 3, L1 TLB entries 304 represent sub-pages. For example, L1 TLB entry 304a represents a first sub-page (SP1) of a second large page (LP2). If a pre-fetched sub-page is the last outstanding sub-page to comprise a large page, DMMU 224 creates an entry in L2 TLB 302 (such as L2 TLB entries 306) for all of the sub-pages that compose the large page.

Figure 4:
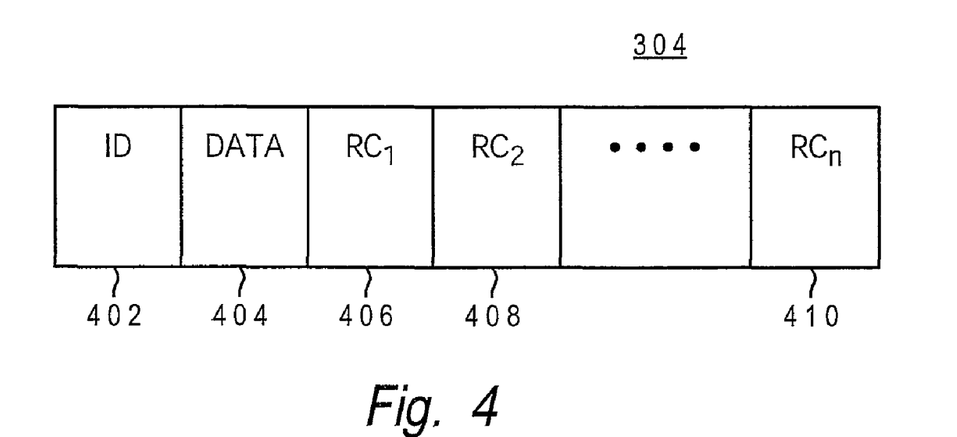
FIG. 4 illustrates a set of fields in a first-tier TLB entry in which a preferred embodiment of the present invention may be implemented.

FIG. 4 illustrates a set of fields in a L1 TLB entry 304 in which a preferred embodiment of the present invention may be implemented. Those with skill in this art will appreciate that each L1 TLB entry 304 can include many additional fields not specifically illustrated in FIG. 4. Because such additional fields are not necessary for an understanding of the present invention, they are not illustrated in FIG. 4 or discussed further herein. As illustrated, each L1 TLB entry 304 includes an identification field 402, data field 404, and a collection of reference counters 406-410.

Identification field 402 preferably includes data identifying L1 TLB entry 304. For example, identification field 402 of L1 TLB entry 304a includes "SP1, LP2", which indicates that L1 TLB entry 304a represents a first sub-page of a second large page stored in L2 TLB 304. Data field 404 preferably includes data stored in the sub-page.

As previously discussed, a large page is comprised of a collection of sub-pages. Therefore, each L1 TLB entry 304 represents a single sub-page in a collection of sub-pages that comprise a large page. A collection of reference counter (RC) entries 406-410 indicate a number of sequential accesses made by DMMU 224 of the current sub-page represented by a L1 TLB entry 304 and subsequent sub-pages. For example, referring back to FIG. 2, if DMMU 224 accesses L1 TLB entry 304a (which represents sub-page 1 of large page 2) and the next access to a sub-page within the same large page (hereinafter referenced as a "virtual access") is to a sub-page specified by L1 TLB entry 304c (which represents sub-page 2 of large page 2), DMMU 224 will increment a value in RC entry 408 of FIG. 4 by one, which indicates a occurrence of a virtual sequential access of L1 TLB entry 304a and L1 TLB entry 304c. The operation of RC entries 406-410 will be discussed later in more detail in conjunction with FIG. 5.

Figure 5:
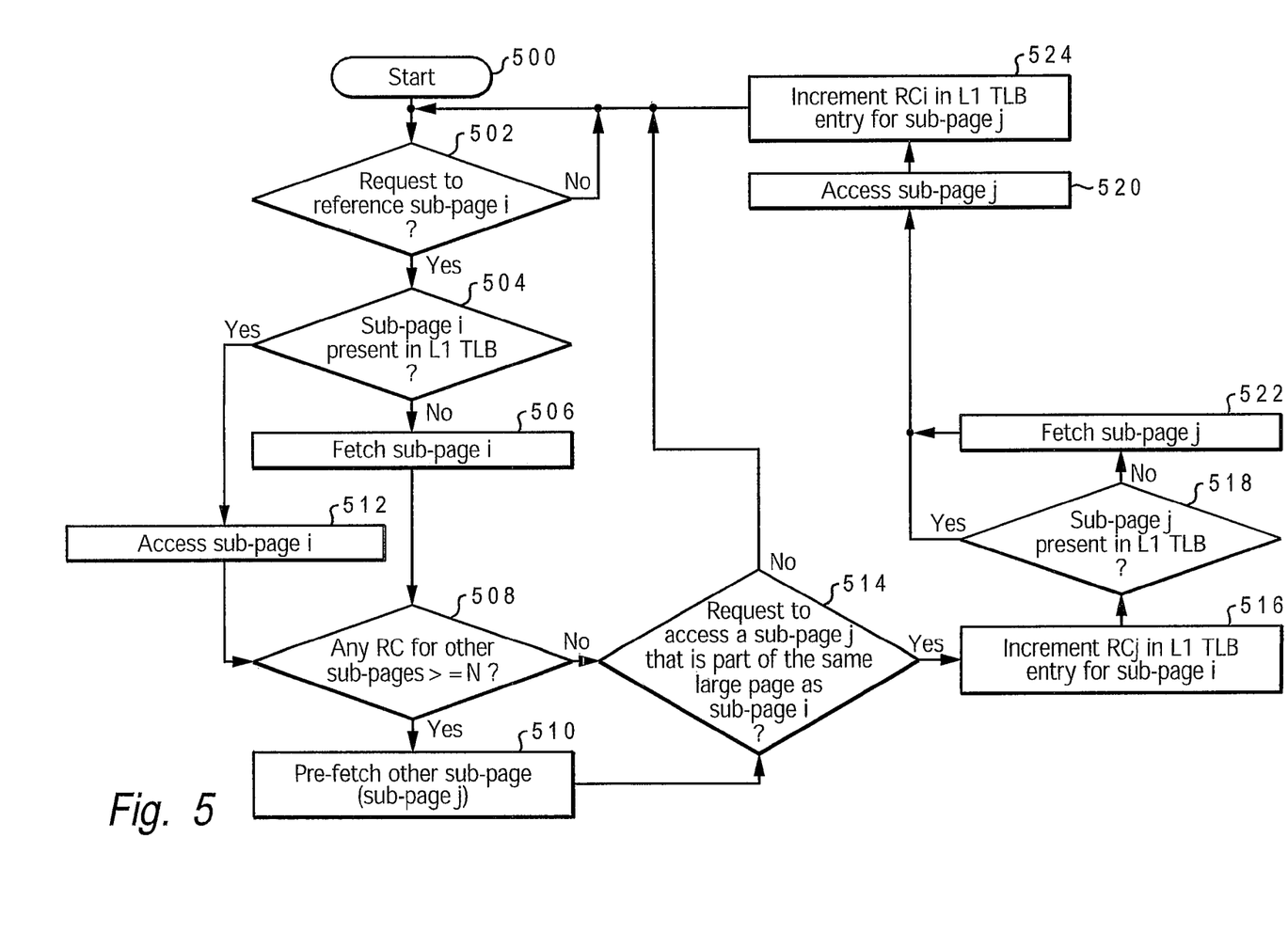
FIG. 5 is a high-level logical flowchart depicting a method of managing virtual memory pages in which a preferred embodiment of the present invention may be implemented.

With reference to FIG. 5, there is a high-level logical flowchart depicting a method of handling large memory pages in which a preferred embodiment of the present invention may be implemented. The process begins at step 500 and continues to step 502, which illustrates DMMU 224 determining whether a request to reference a sub-page i has been received from a data processing system component. If DMMU 224 determines that a request has not been received, the process iterates at step 502.

However, if DMMU 224 determines that a request has been received, the process continues to step 504, which illustrates DMMU 224 determining whether a TLB entry corresponding to the requested sub-page (sub-page i) is present in L1 TLB 300. If a TLB entry corresponding to the requested sub-page is present in L1 TLB 300, the process continues to step 512, which illustrates DMMU 224 directly accessing a L1 TLB entry 304 corresponding to the requested sub-page and transferring the data to the requesting data processing system element.

Returning to step 504, if DMMU 224 determines that a L1 TLB entry corresponding to the requested sub-page is not present in L1 TLB 300, the process continues to step 506, which illustrates DMMU 224 fetching the requested sub-page and creating a new entry in L1 TLB 300. DMMU 224 accesses page frame table 116, present in system memory 104, to obtain the necessary page table entry to fulfill the memory page request. The process then continues to step 508.

Returning to step 512, after DMMU 224 accesses L1 TLB entry 304 representing the requested sub-page, the process continues to step 508, which illustrates DMMU 224 determining whether L1 TLB entry 304 representing the requested sub-page includes a reference counter (RC) for any other related sub-pages for which the counter equals or exceeds a pre-determined value N. If DMMU 224 determines that a RC corresponding to a related sub-page exists equals or exceeds a pre-determined value N, the process continues to step 510, which illustrates DMMU 224 instructing hardware pre-fetch engine 232 to pre-fetch the sub-page (sub-page j) that corresponds to the RC that equals or exceeds the pre-determined value. The process then continues to step 514.

Returning to step 508, if DMMU 224 determines that no RC corresponding to a related sub-page equals or exceeds a pre-determined value N, the process continues to step 514, which illustrates DMMU 224 determining whether a request to access a sub-page (sub-page j), which corresponds to the same large page as sub-page i, has been received from a data processing component. If DMMU 224 has not received such a request, the process returns to step 502 and proceeds in an iterative fashion. However, if DMMU 224 has received such a request, the process continues to step 516, which illustrates DMMU 224 incrementing RCj for the L1 TLB entry for sub-page i.

Then, the process proceeds to step 518, which illustrates DMMU 224 determining whether requested L1 TLB entry 302 corresponding to sub-page j is present in L1 TLB 300. If sub-page j is present in L1 TLB 300, the process continues to step 520, which illustrates DMMU 224 accessing a L1 TLB entry 304 corresponding sub-page j. The process then returns to step 502 and proceeds in an iterative fashion.

However, returning to step 518, if DMMU 224 determines that the L1 TLB entry 302 corresponding to sub-page j is not present in L1 TLB 300, the process continues to step 522, which illustrates DMMU 224 instruction hardware pre-fetch engine 232 to fetch an L1 TLB entry 302 corresponding to sub-page j from system memory 104. The process then continues to step 520, which depicts DMMU 224 accessing a L1 TLB entry 302 corresponding to sub-page j. Next, RCj for the L1 TLB entry sub-page j is incremented, as depicted in step 524. Other preferred embodiments of the present invention may include only incrementing RCj, as illustrated in step 516, or only incrementing RCi, as depicted in step 524. The process then returns to step 502 and proceeds in an iterative fashion.

Figure 6:
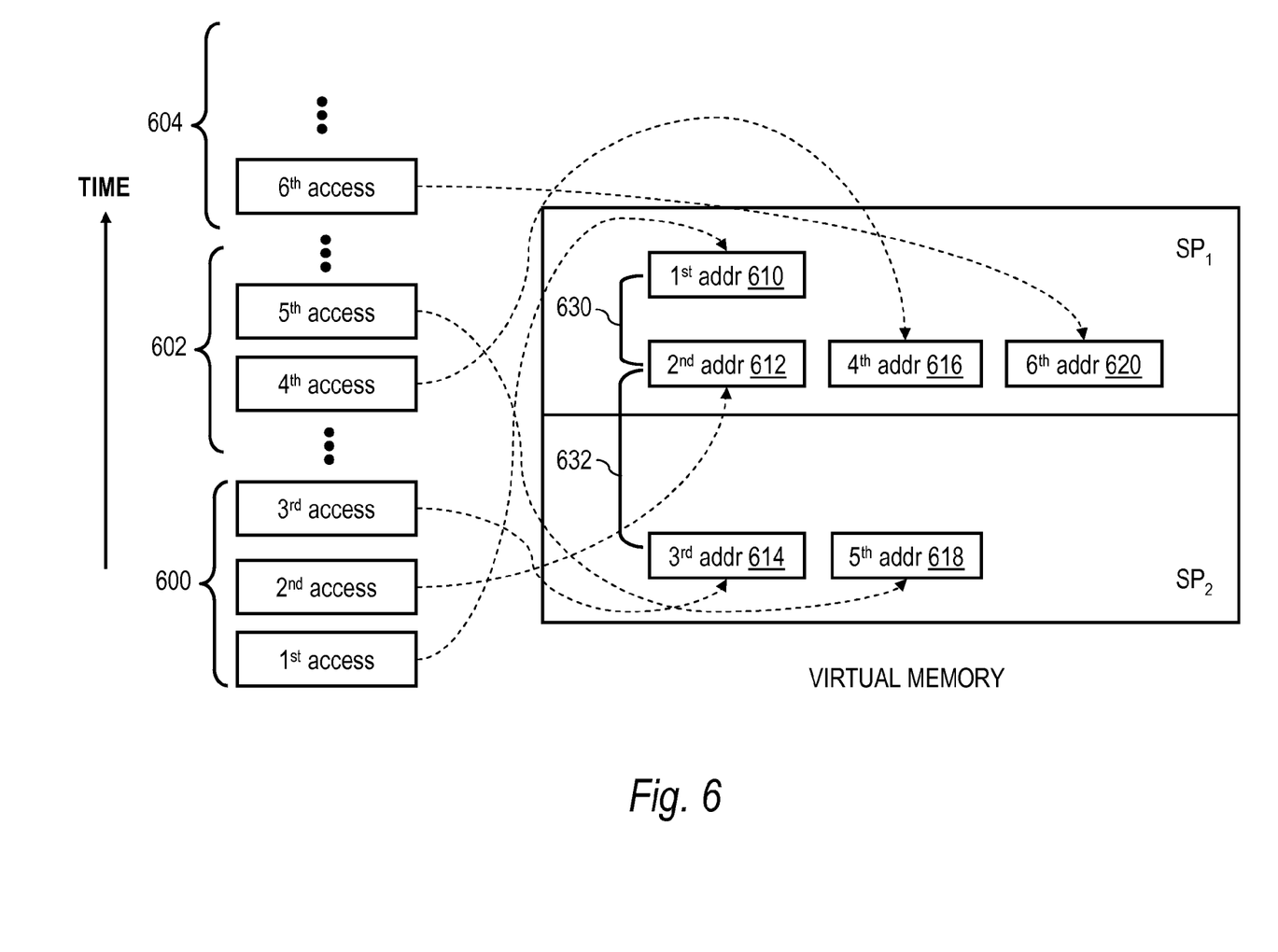
FIG. 6 depicts an exemplary operating scenario of the process of FIG. 5.

As disclosed, the present invention is a system and method of improved handling of large pages in a virtual memory system. A data memory management unit (DMMU) detects a virtual sequential access of a first sub-page and a second sub-page out of a set of sub-pages that comprise a same large page. Then, the DMMU receives a request for the first sub-page and in response to such a request, the DMMU instructs a pre-fetch engine to pre-fetch at least the second sub-page if the number of detected virtual sequential accesses exceeds a predetermined value. In one exemplary operating scenario of this process depicted in FIG. 6, the DMMU receives a first access sequence 600 accessing a first address 610, second address 612, and a third address 614, where first and second addresses 610, 612 belong to a first sub-page $SP_1$ of a plurality of sub-pages and third address 614 belongs to a second sub-page $SP_2$ of the plurality of sub-pages. A first stride 630 between first and second addresses 610, 612 does not equal a second stride 632 between second and third addresses 612, 614. If a second access sequence 602 accesses a fifth address 618 in second sub-page $SP_2$ immediately after accessing a fourth address 616 in first sub-page $SP_1$, the pre-fetch engine pre-fetches from second sub-page $SP_2$ upon a third access sequence 604 accessing a sixth address 620 in first sub-page $SP_1$.

While this invention has been particularly shown as described with reference to a preferred embodiment, it will be understood by those skilled in this art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of such signal-bearing media include, without limitation, recordable-type media such as floppy disks or CD-ROMs and transmission-type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:
    a system memory including a page frame table containing mappings between effective addresses in a plurality of virtual memory pages and physical addresses in the system memory, the plurality of virtual memory pages including large pages each including multiple sub-pages;
    a processor, coupled to said system memory via an interconnect, wherein said processor includes:
    a pre-fetcher; and
    a data memory management unit (DMMU) having a first-level cache memory for storing only mappings for sub-pages and a second-level cache memory for storing only mappings for the large pages, the first-level cache memory including a plurality of entries each containing a mapping for a respective one of the sub-pages, wherein the DMMU, after detecting a first access sequence including different first, second, and third addresses, wherein said first and second addresses belong to a first sub-page, said third address belongs to a second sub-page, and a first stride between said first and second addresses does not equal a second stride between said second and third addresses, determines if a second access sequence accesses a fifth address in said second sub-page immediately after accessing a fourth address in said first sub-page, and wherein the DMMU, responsive to said determination, instructs said pre-fetcher to pre-fetch from at least said second sub-page upon a third access sequence accessing a sixth address in said first sub-page.

2. The data processing system according to claim 1, wherein said pre-fetcher pre-fetches from said second sub-page if one of the plurality of entries in the first-level cache memory indicates a number of detected sequential accesses between said first sub-page and said second sub-page equals or exceeds a predetermined value.

3. The data processing system according to claim 1, wherein said data memory management unit, responsive to the second access sequence, modifies an entry among the plurality of entries in the first-level cache memory, wherein said entry includes at least an identification field and a plurality of reference counters.

4. The data processing system according to claim 3, wherein said data memory management unit increments at least one reference counter among said plurality of reference counters in response to detecting the second access sequence contains a sequential access between said first sub-page and said second sub-page.

* * * * *